(12) United States Patent
Dallmann et al.

(10) Patent No.: US 6,427,666 B1
(45) Date of Patent: Aug. 6, 2002

(54) FUEL INJECTION VALVE

(75) Inventors: Frank Dallmann, Stuttgart; Norbert Keim, Löchgau; Dieter Etzel, Eberdingen-Nussdorf, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/647,051

(22) PCT Filed: Dec. 29, 1998

(86) PCT No.: PCT/DE98/03805

§ 371 (c)(1),
(2), (4) Date: Nov. 30, 2000

(87) PCT Pub. No.: WO99/49211

PCT Pub. Date: Sep. 30, 1999

(30) Foreign Application Priority Data

Mar. 25, 1998 (DE) .......................................... 198 13 020

(51) Int. Cl.⁷ .............................................. F02M 41/00
(52) U.S. Cl. ........................................ 123/467; 239/463
(58) Field of Search .................... 123/467; 239/463, 239/585.1, 585.4, 585.5, 487, 486, 490, 493, 494

(56) References Cited

U.S. PATENT DOCUMENTS

| 4,230,273 A | * | 10/1980 | Claxton et al. ............. 239/125 |
| 4,274,598 A | * | 6/1981 | Wilfert et al. ............. 239/585 |
| 4,621,771 A | | 11/1986 | Chiba et al. |
| 4,899,699 A | | 2/1990 | Huang et al. |
| 5,044,561 A | | 9/1991 | Holzgrefe |
| 5,285,969 A | * | 2/1994 | Greiner et al. ............. 239/463 |

FOREIGN PATENT DOCUMENTS

| DE | 28 07 052 | 8/1979 |
| DE | 34 37 760 | 4/1986 |
| DE | 35 34 125 | 4/1987 |
| DE | 42 18 943 | 12/1993 |

* cited by examiner

Primary Examiner—Willis R. Wolfe
Assistant Examiner—Mahmound Gimie
(74) Attorney, Agent, or Firm—Kenyon & Kenyon

(57) ABSTRACT

A fuel injector that has a valve needle that can be moved axially within a swirl insert and which has, among other things, a valve closing section that works in conjunction with a valve seat. The swirl insert, which has an inner longitudinal opening for the valve needle, has a swirl area having on its downstream end an arrangement for imparting a swirl. The arrangement for imparting swirl are designed in the form of swirl grooves which extend from the conical outer edge to the longitudinal opening and which open out to the lower end face of the swirl insert. The fuel injector is particularly suitable for use in fuel injection systems of internal combustion engines having fuel-air mixture compression and spark ignition

11 Claims, 3 Drawing Sheets

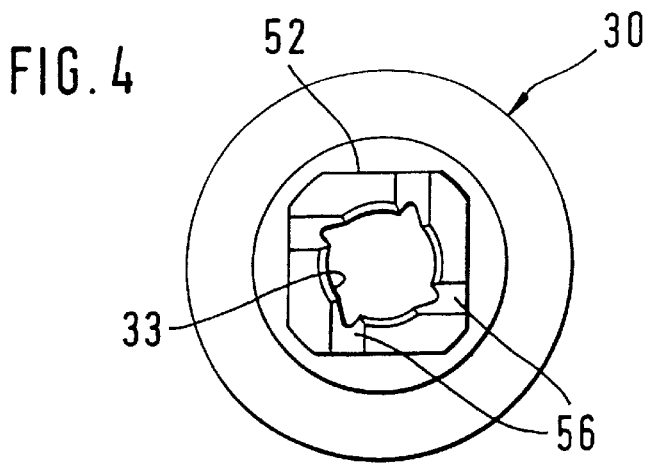
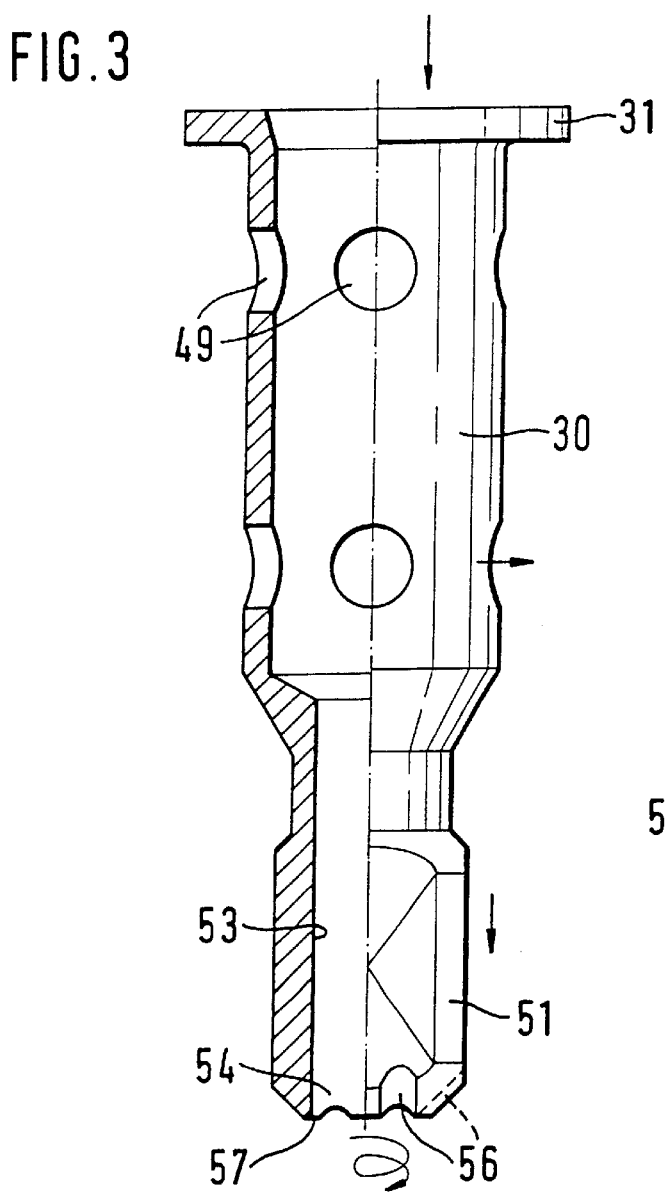
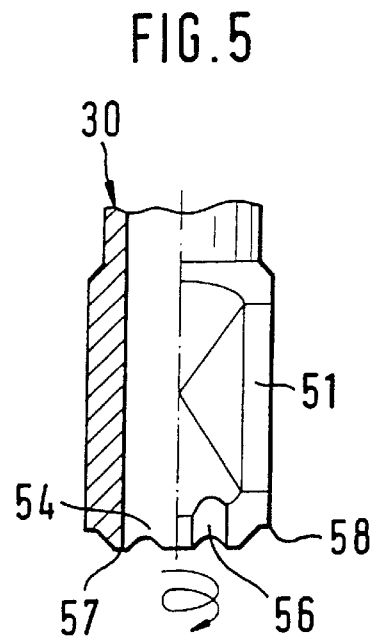

FUEL INJECTION VALVE

FIELD OF THE INVENTION

The present invention relates to a fuel injector.

BACKGROUND INFORMATION

An injection valve for fuel injection systems for internal combustion engines having a nozzle body having an inner guide bore within which a valve needle can move axially is described in German Published Patent Application No. 35 34 125. On its downstream end the valve needle has a sealing section which extends conically and which works in conjunction with a valve seat surface of the nozzle body that is also conically tapered, thus forming a seat valve. Near the conical sealing section, a plurality of metering openings are provided in a lower guide section of the valve needle and distributed around the circumference; they extend at an angle relative to the longitudinal axis of the valve so that a swirling movement is imparted upon the fuel which exits the metering openings in the direction of an injection opening. Herein, the metering openings are arranged as grooves or bores on or near the outer circumference of the axially movable valve needle.

A further fuel injector having a valve needle for opening and closing the valve that can be actuated electromagnetically is described in German Published Patent Application No. 28 07 052. This injection valve also has a nozzle body as a component of a valve housing on the downstream end of which a valve seat is arranged. The axially movable valve needle is guided in an inner bore of a tube-shaped sleeve which is inserted appropriately into the valve housing. At the lower end of the sleeve an annular body whose outer diameter is smaller than the inner diameter of the valve housing is pressed onto an annular flange. The lower end face of the annular body rests against the valve housing. A swirl chamber is created between the annular body and a closing head of the valve needle. The fuel enters the swirl chamber from an outer annular area via two metering bores which are created in the wall of the annular body and which open out tangentially into the swirl area.

A fluid valve via which fuel can be injected in a combustion chamber is described in U.S. Pat. No. 4,621,771. This valve has an actuating device via which a valve needle can be moved axially, the valve needle having a spherical closing element. In addition, the valve has a valve seat element on which a valve seat, in conjunction with which the valve closing element works, is provided. The valve needle is guided in an inner longitudinal opening of a partly conical insert element which has upstream from the valve seat means for imparting swirl to the fuel. Herein, the insert element has on its downstream end a swirl area whose outer edge is conical and which has a plurality of swirl orifices which are obliquely inclined and extend to the longitudinal opening. The insert element is used exclusively to guide the valve needle, to supply the fuel, imparted with swirl, to the valve seat. The fuel cannot flow through the insert element due to the size of the guide opening. The insert element is pressed against a conical seat surface of the valve seat element by a fastening sleeve that is screwed into the valve housing. Openings in the fastening sleeve ensure that the fuel to be conveyed can only flow along the outside of the insert element.

SUMMARY OF THE INVENTION

The fuel injector according to the present invention the advantage that highly favorable flow paths for fuel to which swirl is to be imparted are created in a particularly simple manner. Because the fuel injector has the design features according to the present invention, it has the following advantages: little pressure is lost; flow starts evenly and quickly; and the preliminary jet is very short (the jet is prepared very quickly) so that very "clean" jet profiles can be created. The conical outer edge of the swirl area of the swirl insert and the swirl grooves which open out to the valve seat guarantee that the flow is not sharply deflected when it exits the swirl grooves in the direction of the valve seat. The flow immediately follows the (conical) seat edge in an advantageous manner. In addition, it is advantageous that only a very small swirl chamber volume is present. In addition to the short, favorable flow path already mentioned, which permits very quick jet preparation, the fuel injector according to the present invention has the advantage that it ensures increased linearity of the injection quantity during the injection period.

Further advantages are that the swirl insert is simple and inexpensive to manufacture. In addition, injection values, e.g., the static injection quantity and the jet angle, can be modified subsequently in a very straightforward manner by enlarging the swirl grooves.

An improved seal in the area of the conical wall of the through-opening of the valve seat element and the conical outer edge of the swirl area of the swirl insert can be achieved if a sealing edge that is arranged at an angle relative to the conical edge is created on the outer edge of the swirl area.

BRIEF DESCRIPTION OF THE DRAWINGS

FIG. 3 shows a swirl insert according to FIG. 2, shown as an individual component.

FIG. 4 shows a bottom view of the swirl insert shown in FIG. 3.

FIG. 5 shows an alternative embodiment of the lower end of a swirl insert.

DETAILED DESCRIPTION

Figure 1:
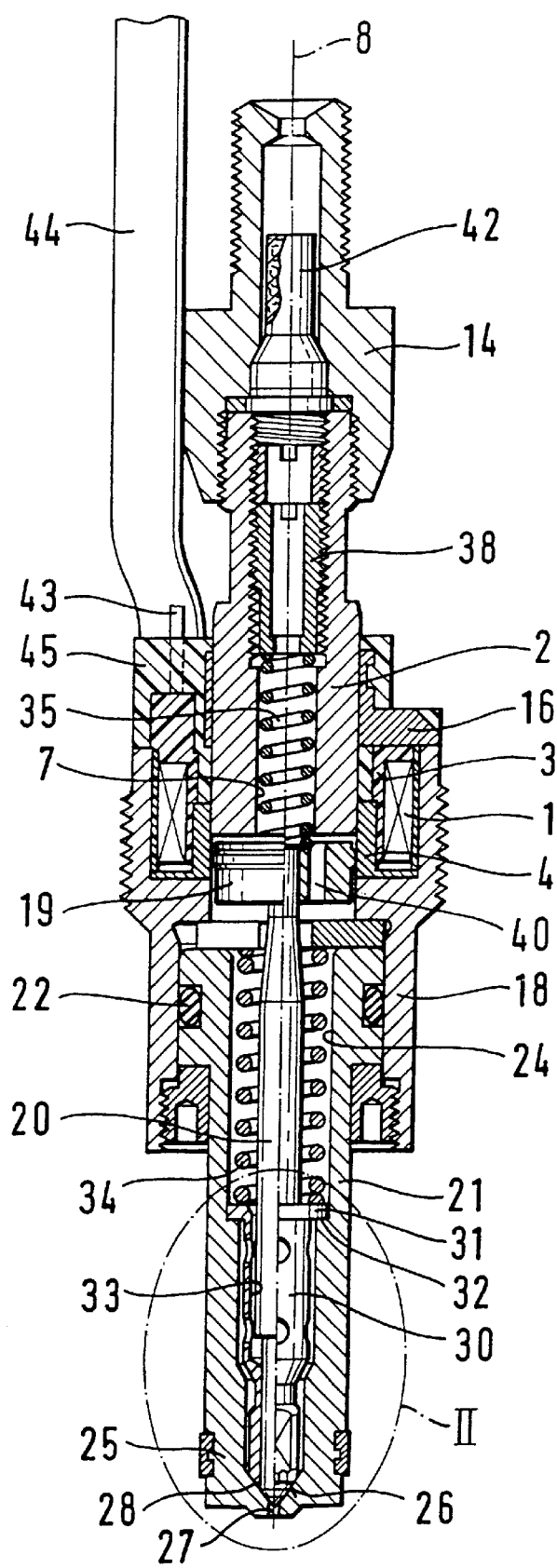
FIG. 1 shows a fuel injector.

The electromagnetically actuatable valve in the form of an injection valve for fuel injection systems of internal combustion engines having fuel-air mixture compression and spark ignition shown by way of an example in FIG. 1 has a tube-shaped largely hollow cylindrical core 2 which is at least partly surrounded by a magnet coil 1 and which serves as the inner pole of a magnetic circuit. The fuel injector is particularly suitable for directly injecting fuel into a combustion chamber of an internal combustion engine. Coil body 3, which is, for example, stepped, holds a winding of magnet coil 1 and in conjunction with core 2 and an intermediate element 4, which is annular, non-magnetic, partly surrounded by magnet coil 1 and has an L-shaped cross section, ensures that the injection valve is particularly compact and quick to assemble in the area of magnet coil 1.

Longitudinal through-opening 7, which extends along valve longitudinal axis 8, is provided in core 2. Core 2, having its longitudinal opening 7, serves, among other things, as the fuel supply channel, forming in conjunction with upper metallic, e.g., ferritic, housing component 14 a fuel intake port. Housing component 14 forms the supply-side end of the fuel injector and at least partially surrounds core 2 in the axial direction. In addition to upper housing component 14, for example two further housing components 16, 18 are provided, middle housing component 16 being in the form of a cap element. As a cap element, middle housing component 16 delimits the coil area of magnet coil 1 on the upper end. Lower housing component 18, which is immovably fixed to middle housing component 16, surrounds magnet coil 1 radially, engages intermediate element 4 from below and partially serves as a guide for an axially movable valve component, In the exemplary embodiment shown in FIG. 1, lower housing component 18 and largely tube-shaped valve seat element 21 are immovable connected to one another via screwing; alternatively they may be joined via welding or soldering. The seal between housing component 18 and valve seat element 21 is created, for example, via a sealing ring 22. Inner through-opening 24 of valve seat element 21, which extends concentrically relative to valve longitudinal axis 8, extends along its entire axial length, the cross section of through opening 24 becoming smaller and smaller in the downstream direction due to various different steps. At its lower end 25, which at the same time forms the downstream end of the entire fuel injector, a conical wall of through-opening 24 of valve seat element 21 forms a valve seat 26. Through-opening 24 ends downstream from valve seat 26 as an outlet opening 27 for the fuel having a comparatively small diameter. Valve needle 20, which is, for example, rod-shaped and has a circular cross section, is arranged in through-opening 24 and has a valve closing section 28 on its downstream end. This conically tapered valve closing section 28 works in conjunction with valve seat 26, which is in the shape of a truncated cone and tapered in the direction of flow, as a seat valve in a manner that is known heretofore.

A tube-shaped swirl insert 30 according to the present invention, whose outer diameter is slightly smaller than the respective diameter of through-opening 24, so that fuel can flow through this intermediate area, is arranged in through-opening 24 of valve seat element 21 at least in the section thereof that adjoins valve seat 26 in the upstream direction. Swirl insert 30, which is fitted into valve seat element 21, has an upper radially protruding collar 31 via which swirl insert 30 rests immovably on an inner shoulder 32 of valve seat element 21. Swirl insert 30 also has an inner longitudinal opening 33 in which valve needle 20 moves up and down, it being possible to create a specially designed inner guide area for valve needle 20. A spiral spring 34, which is fixed to the housing, rests, for example, on the side of collar 31 opposite shoulder 32 and thus presses swirl insert 30 onto valve seat element 21, thus keeping swirl insert 30 from slipping axially. Swirl insert 30 is described in greater detail below with the help of the subsequent figures.

The injection valve is actuated electromagnetically in a known manner. The electromagnetic circuit, having among other things, magnet coil 1, core 2, and armature 19, is used to move valve needle 20 axially and thus open the injection valve against the load imparted by a return spring 35 arranged in the inside of sleeve 10 and, respectively, close it. Armature 19 is attached to the end of valve needle 20 facing away from valve closing section 28, for example via a weld seam, and aligned with core 2. Armature 19 is guided in non-magnetic intermediate element 4 during its axial movement.

An adjustment sleeve 38 is pushed, pressed or screwed into inner longitudinal opening 7 of core 2. Adjustment sleeve 38 is used to set the initial tension in return spring 35, which rests against adjustment sleeve 38 and whose opposite end rests against armature 19 attached to valve needle 20. One or more annular or bore-like flow channels 40, through which the fuel can pass from longitudinal opening 7 into through-opening 24 along valve needle 20, are arranged in armature 19. On the supply side, a fuel filter 42 protrudes into longitudinal opening 7; this filters out fuel components that could cause blockages or damage in the injection valve due to their size. Fuel filter 42 is fixed in place in upper housing component 14 by, for example, being pressed in.

When magnet coil 1 is not in its excited state, one end position of valve needle 20 is defined by the fact that valve closing section 28 of valve needle 20 rests against valve seat 26; when magnet coil 1 is in its excited state the other end position of valve needle 20 is defined by the fact that armature 19 rests against core 2. The surfaces of the components in this stop area are, for example, chrome-plated.

Contact elements 43, which are also arranged outside the actual coil body 3, which is made of plastic, have a plastic coating 45 and create the electrical contact to magnet coil 1, thus causing it to be excited. Cap-like middle housing component 16 has a slit-shaped recess on one part of its circumference precisely at the point where contact elements 43 pass through. Thus plastic coating 45 which surrounds contact elements 43 protrudes through this recess in housing component 16, as can be seen on the left-hand side of FIG. 1. An electrical connection cable 44, via which current is supplied to magnet coil 1, extends from plastic coating 45.

Figure 2:
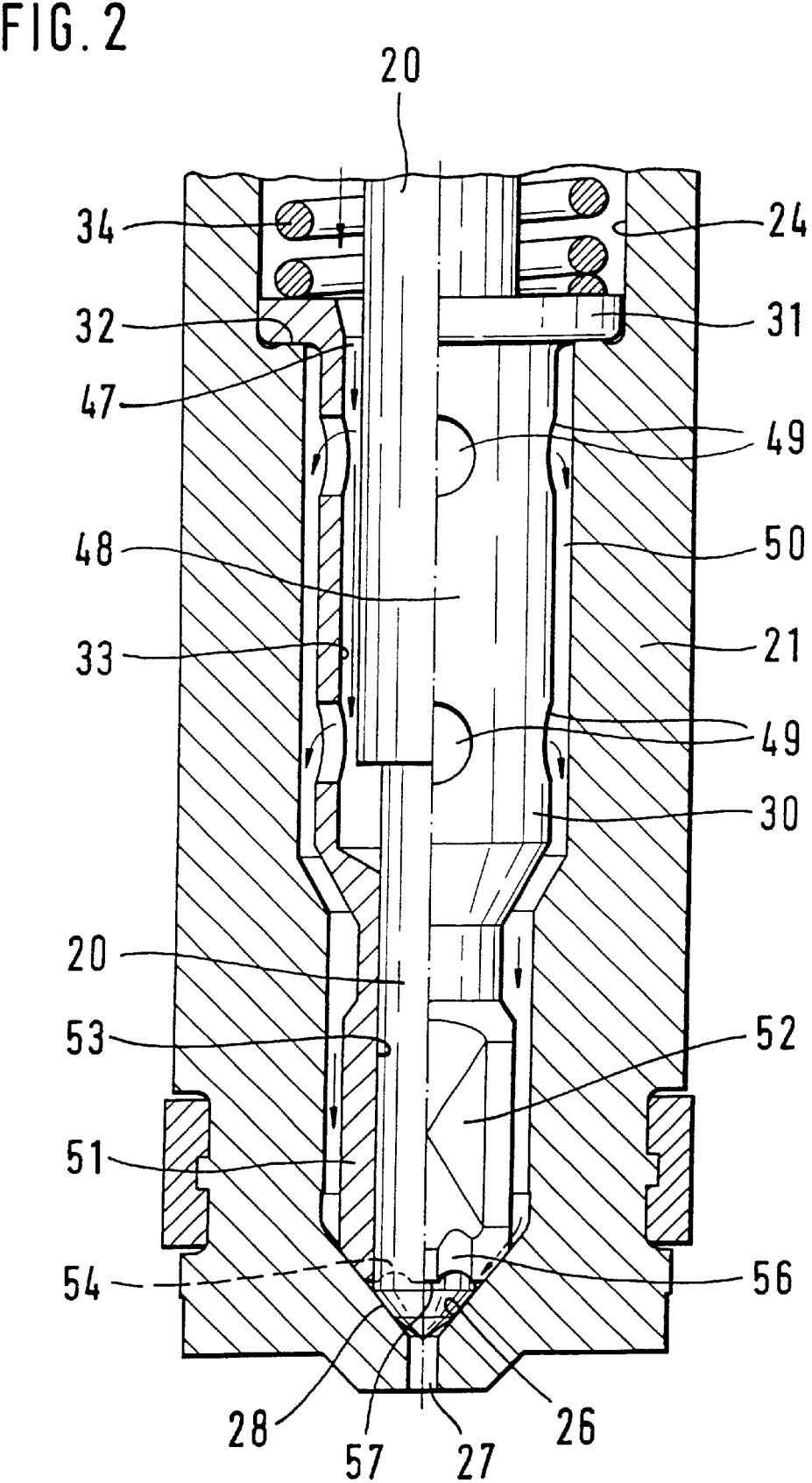
FIG. 2 shows the injection-side end area (indicated as II in FIG. 1) of the fuel injector (modified scale).

FIG. 2 shows the injection-side end area of the fuel injector, which is indicated as II in FIG. 1; the scale has been increased to show clearly the structure of swirl insert 30 and the flow conditions in through-opening 24 of valve seat element 21. The fuel flows out of the upper section of through-opening 24 facing magnet coil 1 and flows into swirl insert 30 in the vicinity of collar 31. In swirl insert 30, an annular intermediate area 47, through which the fuel subsequently flows, is initially created between the outer diameter of valve needle 20 and the wall of longitudinal opening 33. For example a plurality of transverse orifices 49 which are arranged in two axial annular areas, penetrate the wall radially and through which the fuel can pass from intermediate area 47 to outside swirl insert 30 are arranged in an upper section 48 of swirl insert 30 downstream from collar 31.

After passing through transverse orifices 49, the fuel passes axially downstream in the direction of valve seat 26 in an annular area 50 between the outer diameter of swirl insert 30 and the wall of through-opening 24 of valve seat element 21. A lower section 51 of swirl insert 30 around which the fuel circulates has, for example, four flattened ground surfaces 52 so that the outer edge of lower section 51 of swirl insert 30 is largely square in shape, which is particularly clear from FIG. 4. As a guide opening 53 inner longitudinal opening 33 in lower section 51 has a specific diameter so that valve needle 20 is guided in it. Section 51 may also be, for example, triangular or hexagonal.

A lower swirl area 54, which has an outer edge that tapers in the downstream direction, adjoins this square-shaped section 51 at the end facing away from collar 31. Herein, this swirl area 54 rests on the wall of through-opening 24, which in this area is also conical, above valve seat 26. A plurality, for example four, swirl grooves 56 in swirl area 54 extend radially from the conical outer edge to inner longitudinal opening 33. Swirl grooves 56, which are created, for example, via grinding and extend parallel to conical valve seat 26, open out to lower face 57 of swirl insert 30 thanks to the fact that they are arranged in lower swirl area 54 and thus constitute channels on the end face. As a result of the eccentricity of swirl grooves 56 and due to the fact that they are oriented tangentially relative to inner longitudinal opening 33, which in this area forms a swirl chamber, a swirl component is imparted on the flow as it exits respective swirl groove 56. Thus specific required parameters such as jet distribution and droplet size can be achieved precisely in an ideal manner. When magnet coil 1 is excited and valve closing section 28 of valve needle 20 is lifted off valve seat 26, the fuel is correspondingly released into discharge orifice 27 and then discharged from the fuel injector.

FIG. 3 shows swirl insert 30 according to the present invention as an individual component in a manner known from FIG. 2. FIG. 4 shows a bottom view of swirl insert 30 shown in FIG. 3. From FIG. 4 it is particularly evident that lower section 51 of swirl insert 30 has, for example, four ground surfaces 52 which are at right angles to one another, so that a largely square outline is created. Starting from these four ground surfaces 52, the four square grooves 56, which open out into inner longitudinal opening 33, are created in swirl area 54. Swirl grooves 56 extend, for example, tangentially relative to longitudinal opening 33. In cross section, swirl grooves 56 are, for example, arched like the mouth of a tunnel.

Instead of swirl grooves 56 shown in FIGS. 2 to 4, swirl orifices 56 in the form of swirl bores (not shown) may also be created in lower swirl area 54. Just like swirl grooves 56 described in detail above, these swirl bores extend parallel to conical valve seat 26. However, as they are swirl bores, these swirl orifices have a wall that separates them from the outer edge of swirl area 54, the wall thickness being in the range of from 0.2 to 0.5 mm. The swirl bores also end on lower end face 57 of swirl insert 30.

FIG. 5 shows an alternative embodiment of lower section 51 of swirl insert 30. Herein, the conical outer edge of swirl area 54 is primarily modified. In the exemplary embodiment shown in FIGS. 2 and 3, the transition from section 51 to swirl area 54 has no step or shoulder on its outer edge; by contrast, the exemplary embodiment shown in FIG. 5 has a sealing edge 58 in this transitional area, which constitutes a shoulder that extends, for example, at right angles to section 51. Sealing edge 58 guarantees an effective seal and when installed rests against the inner wall of valve seat element 21 above valve seat 26.

What is claimed is:
1. A fuel injector for a fuel injection system of an internal combustion engine, comprising:
  a valve needle including a valve closing section;
  a valve seat element on which a valve seat is formed, the valve seat cooperating with the valve closing section;
  an actuating device via which the valve needle can be moved axially; and
  a swirl insert including:
    an inner longitudinal opening for the valve needle,
    an arrangement for imparting a swirl on a fuel, the arrangement being provided upstream from the valve seat, and
    a lower end face, the swirl insert including at a downstream end thereof a swirl area, the swirl area including an outer edge that is conical and a plurality of swirl orifices that are obliquely inclined and extend to the inner longitudinal opening and that extend to the lower end face, wherein:
    the inner longitudinal opening of the swirl insert includes in an upper section a diameter that is greater than an outer diameter of the valve needle so that an annular intermediate area through which the fuel can flow is formed.

2. The fuel injector according to claim 1, wherein:
the fuel injector directly injects the fuel into a combustion chamber of the internal combustion engine.

3. The fuel injector according to claim 1, wherein:
the upper section of the swirl insert includes a plurality of transverse openings that penetrate a wall of the inner longitudinal opening radially and through which the fuel can pass from the annular intermediate area into an annular area formed between the valve seat element and the swirl insert.

4. The fuel injector according to claim 1, wherein:
the valve seat is conical, and
the swirl orifices extend parallel to the valve seat.

5. The fuel injector according to claim 1, wherein:
the swirl orifices include swirl grooves that open out to the conical outer edge and to the lower end face.

6. The fuel injector according to claim 1, wherein:
the swirl orifices include swirl bores that are separated from the conical outer edge by a wall having a thickness of 0.2–0.5 mm.

7. The fuel injector according to claim 1, wherein the swirl insert includes:
a lower section facing the swirl area and including a largely square outer edge formed from ground surfaces of the lower section.

8. The fuel injector according to claim 1, wherein:
the conical outer edge of the swirl area includes no step.

9. The fuel injector according to claim 1, wherein:
a sealing edge is arranged at an angle relative to the conical outer edge of the swirl area.

10. The fuel injector according to claim 5, wherein:
the swirl grooves are created by a grinding operation.

11. A fuel injector for a fuel injection system of an internal combustion engine comprising:
  a valve needle including a valve closing section;
  a valve seat element on which a valve seat is formed, the valve seat cooperating with the valve closing section;
  an actuating device via which the valve needle can be moved axially; and
  a swirl insert including:
    an inner longitudinal opening for the valve needle,
    an upper collar facing away from the swirl area and resting on a shoulder of the valve seat arrangement,
    an arrangement for imparting a swirl on a fuel, the arrangement being provided upstream from the valve seat, and
    a lower end face, the swirl insert including at a downstream end thereof a swirl area, the swirl area including an outer edge that is conical and a plurality of swirl orifices that are obliquely inclined and extend to the inner longitudinal opening and that extend to the lower end face, wherein:
    the inner longitudinal opening of the swirl insert includes in an upper section a diameter that is greater than an outer diameter of the valve needle so that an annular intermediate area through which the fuel can flow is formed.

* * * * *

UNITED STATES PATENT AND TRADEMARK OFFICE
CERTIFICATE OF CORRECTION

PATENT NO.    : 6,427,666 B1
DATED         : August 6, 2002
INVENTOR(S)   : Dallmann et al.

It is certified that error appears in the above-identified patent and that said Letters Patent is hereby corrected as shown below:

Column 1,
Line 66, change "invention the" to -- invention has the --;

Signed and Sealed this

Fourth Day of November, 2003

JAMES E. ROGAN
*Director of the United States Patent and Trademark Office*